United States Patent Office 2,945,891
Patented July 19, 1960

2,945,891

PROCESS FOR THE RECOVERY OF SECONDARY ALCOHOLS

Frederik H. Van Heel, Rhoon, Netherlands, assignor to Shell Oil Company, a corporation of Delaware No Drawing. Filed July 11, 1958, Ser. No. 747,843

Claims priority, application Netherlands July 12, 1957

10 Claims. (Cl. 260—639)

This invention relates to the manufacture of secondary alcohols by reacting the corresponding olefins with a strong, polybasic, inorganic acid and hydrolyzing the resulting esters of that acid with water. More particularly, this invention relates to an improved process for hydrolyzing the esters, and for recovering the product alcohols from the crude reaction mixtures resulting from the hydrolysis of the esters.

It is well known that a secondary alcohol can be produced by absorbing an olefin which has the olefinic double bond between carbon atoms to each of which at least one hydrogen atom is directly attached in a strong, polybasic, inorganic acid or aqueous solution thereof, to form alkyl esters of that acid, hydrolyzing the esters with water to the corresponding secondary alcohol, and recovering the alcohol from the resulting mixture. Isopropyl alcohol is prepared from propylene and secondary butyl alcohol is prepared from n-butylenes on a large scale by such a process, the strong inorganic acid ordinarily being sulfuric acid.

Two general variations of the process are used for the production of isopropyl alcohol. In the first, the so-called "weak-acid" process, the propylene containing stream is reacted with a relatively dilute solution of the acid, for example, a solution of sulfuric acid in water containing from about 60% to about 80% by weight of sulfuric acid, any unreacted hydrocarbon materials are removed, and the resulting acid mixture containing isopropyl alcohol from hydrolysis of propyl esters of the acid by the water is passed directly to a stripping zone wherein the isopropyl alcohol is stripped from the mixture. Usually, the water consumed in the reaction is replaced before the mixture is stripped of the alcohol, or the water of reaction is replaced by means of steam injected into the stripping zone. In some cases, a combination of the two techniques is used. Sometimes additional water is added to the mixture before it is stripped of alcohol to reduce the concentration of the acid therein, and to insure complete hydrolysis of any esters therein, and the stripped acid is thereafter reconcentrated for re-use. In other cases, no additional water is added, and the acid mixture is simply recycled in a closed circuit, only water of reaction being added thereto. Such a process is set out in detail in United States Patent No. 2,609,400. Alternatively, the so-called "strong-acid" process can be used. In this variation of the basic process, the propylene containing stream is reacted with a strong solution of the acid—for example, pure (100%) sulfuric acid, or aqueous solutions of sulfuric acid containing above about 80% by weight of sulfuric acid— any unreacted hydrocarbon materials are removed, the resulting acid mixture is diluted with water or weak sulfuric acid until the concentration of sulfuric acid is below about 70% by weight, the alkyl esters of sulfuric acid allowed to hydrolyze, and the resulting acid mixture is stripped of the alcohol therein by methods similar to those used in the weak-acid process.

Secondary butyl alcohol, and secondary alcohols containing five or more carbon atoms, are usually prepared by the "strong-acid" process, the concentration of the acid reacted with the olefin stream, and the concentration of the acid in the mixture which is stripped of alcohol being suitably chosen with respect to the particular olefin and alcohol involved.

Both the "weak-acid" process and the "strong-acid" process are described in detail in United States Patent No. 2,776,324. Since the present invention is drawn only to the recovery of the product alcohol from the acid-alcohol mixture, and the manner in which the acid-alcohol mixture is prepared does not form any part of this invention, in the interest of brevity, those portions of the said U.S. Patent No. 2,776,324 pertinent to the preparation of the acid-alcohol mixture are hereby incorporated into and made a part of the disclosures of this specification, to provide the setting for the present invention.

In these prior art processes, stripping of the alcohol from the alcohol-acid mixture has been effected by feeding the mixture to a distillation column wherein the mixture is subjected to a distillation to remove the alcohol product overhead, and the stripped acid below. This procedure has been found to have certain substantial drawbacks. First, the reaction of olefin with water to form alcohol is a reversible reaction, and is catalyzed in both directions by acid, so that because of the time and temperatures involved in the stripping operation, a substantial proportion of the product alcohol and/or its alkyl ester precursors reverts to the source olefin. That olefin, and any simply dissolved in the acid, tends to polymerize. To prevent undue reversion of alcohol and/or its precursors to olefin and polymerization of the olefin, the rate at which the alcohol can be stripped from such alcohol-acid mixtures by such distillation techniques has been quite restricted, with consequent restricted throughput in a given stripping column. Second, the alcohol-acid mixtures of the sort encountered in such a process tend to foam, thus further substantially reducing the throughput in a given stripping column, and causing unsteady-state operation, leading to variation in the composition and purity of the alcohol product and to increased reversion.

As is shown in both of the prior art patents cited hereinbefore, an attempt to overcome the objectionable features of the stripping operation was made by providing an additional stripping agent in the stripping zone. Thus, in addition to simple distillation of the alcohol-acid mixture to recover the alcohol therein, the mixture was also subjected to the action of an inert gas, which improved the efficiency of the alcohol removal. In most cases, the inert gas used was steam. These modifications of the stripping operation partly overcame the objectionable features of the earlier unmodified stripping operation. Since the steam (or like) stripping operation reduced somewhat both the time and the temperature required for the stripping of the alcohol, reversion of the alcohol to the olefin was reduced somewhat, and polymer formation likewise reduced somewhat. The alcohol-acid mixtures encountered still tended to foam, and the modified operation did not overcome this objectionable feature.

I have now found that the foaming problem is completely solved by carrying out the stripping of the alcohol-acid mixture in a new way. Further, I have found that by carrying out the stripping in this new way, a markedly greater amount of the acid-alcohol mixture can be stripped in a given stripping unit, wtihout significant increase in the reversion of the alcohol and/or its precursors to the olefin. The increase in throughput has been found to be substantially greater than that which would result merely by eliminating the foam. Still further, I have found that these advantages are obtained in many cases with a substantial reduction in the amount of steam required to effect the stripping of the alcohol.

Briefly, I have found that the aforesaid advantages are obtained if the alcohol-acid mixture resulting from hydrolysis of the esters is mixed with a substantial amount of steam and the resulting mixture is passed substantially immediately thereafter into a flash distillation zone in such a way that the liquid portion of the mixture is maintained as a liquid film in that zone while the vaporous materials are flashing therefrom. This discovery is embodied in the process which consists of thoroughly mixing steam with the alcohol-acid mixture at a very fast rate, and within a very short time thereafter passing the steam-alcohol-acid mixture to a flash distillation zone, to effect flash distillation of at least a part of the alcohol in that mixture to vapor and removing the vaporous alcohol from the flash zone, the steam-alcohol-acid mixture being introduced into the flash zone as a liquid film on a solid surface within that zone and the liquid portion of that mixture being maintained as a liquid film on a solid surface within that zone during the period that the flash distillation is occurring. Preferably, the liquid film within the flash zone is also subjected to centrifugal forces. The way in which the steam-acid-alcohol mixture is formed as a liquid film in the flash distillation zone and the film subjected to centrifugal forces while the alcohol is flashing to vapor from that film will be set out hereinafter.

As has been pointed out hereinbefore, the manner in which the alcohol-acid mixture is prepared forms no part of this invention. The process of the invention is applicable to any of the alcohol-acid mixtures obtained in the prior art processes, whether the "weak-acid" variation be used, or the "strong-acid" variation be used.

According to this invention, the alcohol-acid liquid mixture is first mixed with steam, the time required for the mixing being as short as is commensurae with thorough mixing of the steam with the liquid mixture, and then the resulting mixture of steam, acid and alcohol is passed in as short a time as possible thereafter into, and as a liquid film within, the flash distillation zone. (For the purpose of brevity, the time period between the beginning of the mixing of the steam and the alcohol-acid mixture and the formation of the resulting steam-acid-alcohol mixture as a liquid film in the flash distillation zone will be referred to herein as the "residence time.") In this type of system, mixing is closely related to heat transfer—i.e., the amount of heat transferred from the steam to the liquid alcohol-acid mixture per unit time varies as some direct function of the degree of mixing between the steam and the liquid mixture. Two processes—the physical process of converting liquid alcohol to vaporous alcohol and the chemical process of reversion of the alcohol (or its precursors, alkyl esters of the inorganic acid) to the source olefin—compete for the heat transferred. It has been found that if the heat in the steam is transferred to the liquid alcohol-acid mixture at very high rates, and the vaporous alcohol is then removed from the liquid substantially immediately thereafter, substantially all of that heat is consumed in vaporizing the alcohol, and that substantially none of the heat is consumed in reversion of the alcohol and/or its precursors to the source olefin. Thus, the steam must be mixed with the alcohol-acid mixture as thoroughly as possible in as short a time as possible and then the vaporous alcohol must be removed from the liquid in the resulting mixture as quickly as possible by forming the liquid portion of the resulting mixture as a liquid film in the flash distillation zone as soon as possible after the mixing of the steam and the liquid is complete.

To illustrate the magnitude of the time period contemplated as the permissible residence times, in laboratory scale experimental runs, both isopropyl alcohol and secondary butyl alcohol have been efficiently recovered from the corresponding alcohol-sulfuric acid mixture by the process of this invention using residence times of the order of 0.2 to 0.5 millisecond, while in corresponding commercial plant-scale experimental runs, isopropyl alcohol was efficiently recovered using residence times of the order of 2 to 4 milliseconds. Accordingly, it will be evident that the permissible residence time will depend upon the particular type and size of apparatus used to effect the mixing of the steam and the alcohol-acid mixture and to effect introduction of the resulting mixture as a liquid film in the flash distillation zone. Generally speaking, the residence time need not exceed about 10 milliseconds and it is preferred that the residence time not exceed about 5 milliseconds. In most cases, the necessary degree of mixing of the steam with the alcohol-acid mixture can be effected and the liquid portion of the resulting mixture can be formed as a film in the flash distillation zone in from about 0.2 to about 4.0 milliseconds, and since optimum benefit is derived from this invention employing such residence time, it is preferred that the residence time be from about 0.2 to about 4.0 milliseconds. In most cases, a steam contact time of at least about 0.05 millisecond will be required to effect the necessary degree of mixing of the steam with the alcohol-acid mixture and to effect the necessary transfer of heat from the steam to the alcohol; preferably, the residence time is at least 0.1 millisecond to insure that the necessary mixing and heat transfer is effected. In general, it is preferable to use the shortest residence time which provides the necessary degree of mixing.

The temperature of the alcohol-acid mixture suitably may be from about room temperature (20° C.) up to the temperature at which the alcohol begins to distil therefrom. In many cases, it will be found preferable that the alcohol-acid mixture be near the alcohol distillation temperature, since less heat will have to be supplied via the steam to effect vaporization of a given amount of the alcohol. In the usual case, however, the temperature of the alcohol-acid mixture is conveniently that at which it happens to be following hydrolysis of the alkyl esters of the inorganic acid in the crude reaction mixture. Adequate heat of alcohol vaporization can be introduced via the steam, so that no separate preliminary heating of the alcohol-acid mixture is required.

Saturated steam—containing no superheat—is quite satisfactory; wet steam—steam only partly saturated—is normally not satisfactory, since the liquid water therein may interfere with the vaporization of the alcohol. Since in most cases a large amount of heat must be transferred in a very short period of time, it is often desirable to use superheated steam—the superheat provides a greater temperature differential to force the transfer of heat. However, it must be noted that any heat in the mixing zone which is not consumed in vaporizing alcohol is undesirable, since any such excess heat will promote reversion of the alcohol and/or its precursors to the source olefin. If so much heat is present that all of that heat cannot be transferred to vaporization of the alcohol in the residence time permitted, reversion will occur. Consequently, the amount of steam used, and its superheat, must be carefully correlated with the amount of alcohol-acid mixture used, and its temperature, and with the permitted residence time in the physical apparatus used to effect mixing of the steam with the alcohol-acid mixture and introduction of that mixture into the flash distillation zone. As a practical maximum, if superheated steam is used, it is desirable that the steam be superheated not more than about 70° C., and in most cases, to insure that reversion is minimized, it is desirable that the steam be superheated not more than about 50° C. Steam at about 120° C. to about 140° C. will be suitable in the majority of cases.

The amount of steam used of course will depend upon the heat balance involved—the temperature of the alcohol-acid mixture, the temperature of the steam—whether superheat is available or not, and if so, how much—and the amount of the alcohol to be vaporized. To obtain physically the necessary mixing and heat transfer, it is necessary that at least about 0.05 pound of steam be used per pound of the alcohol-acid mixture, and it is preferred to use at least 0.10 pound of steam per pound of alcohol-acid mixture. Normally, it will not be necessary to use more than about 1.5 pounds of steam per pound of alcohol-acid mixture, and in most cases little additional advantage will accrue from the use of more than about one pound of steam per pound of the alcohol-acid mixture.

The mixing of the steam and the liquid alcohol-acid mixture can be effected in any way which provides the necessary degree of mixing within the allowable residence time. In most cases, the necessary degree of mixing can be obtained within the allowable time limits most easily through the use of a jet mixer, eductor or like apparatus, the outlet of which is immediately adjacent in both time and space to, or preferably, is within, the flash distillation zone, so that the steam-alcohol-acid mixture can be passed from the mixer into the flash distillation zone within the allowable residence time limit.

Mixing of the steam and the alcohol-acid mixture preferably is accomplished by introducing the steam and the alcohol-acid mixture into a mixing nozzle designed so that the alcohol-acid mixture is subjected to a high intensity shearing action and to high turbulence by the steam. Such a mixing action can be conveniently effected by introducing the liquid alcohol-acid mixture into a stream of steam moving at a relatively high velocity (e.g., 300 feet per second), the liquid mixture being initially in the form of small droplets (e.g., spray) moving at relatively low velocity (e.g., 5–10 feet per second) at an angle to the direction in which the steam is flowing. The alcohol-acid mixture may be broken up into small droplets by means of a spray nozzle, by use of deflectors, baffles or other mechanical device in which the alcohol-acid stream strikes the device and by impingement is broken up into small droplets; alternatively, the alcohol-acid stream may be fed upwardly into the path of the steam travelling in a direction at a substantial angle (preferably about 90 degrees) to the surface of the liquid, the steam removing liquid from that surface and violently dispersing the liquid as small droplets in the steam. The mixing nozzle is so positioned with respect to the flash distillation zone that the time required for the mixing plus the time required for the mixture to pass from the nozzle into the flash distillation zone does not exceed the allowable residence time.

The steam temperature, the temperature of the alcohol-acid mixture, the pressure on the alcohol-acid mixture, the steam pressure, the amount of steam mixed with a unit amount of the alcohol-acid mixture and the pressure maintained in the flash distillation zone all are related factors—in that each of these factors bears on and is related to the amount of the alcohol flashed from the alcohol-acid mixture in the flash distillation zone.

These factors can be adjusted so that but a part of the alcohol in the alcohol-acid mixture is vaporized, or they can be so adjusted that substantially all of the alcohol in the mixture is vaporized. Because of the difficulty which in some cases arises in obtaining the necessary degree of mixing and heat transfer in the limited residence times permissible, it sometimes becomes difficult to effect flashing of all of the alcohol in the alcohol-acid mixture in a single reaction stage without causing undue reversion of the alcohol and/or its precursors to the source olefin. In such cases, a choice is available: flashing of but part of the alcohol can be tolerated, or more than one flashing stage involving use of this invention can be used, or as pointed out in detail hereinafter, a part of the alcohol can be flashed by the use of this invention, and a part or all of the remainder removed by conventional distillation techniques. Which choice will be used in any particular case will usually be determined by economic considerations. It has been found that up to 80% of the alcohol in the usual alcohol-acid mixtures considered herein is easily flashed to vapor in a single stage employing this invention without causing undue reversion of the alcohol and/or its precursors to the source olefin. For reasons of economic operation it is usually desirable that at least 40% of the alcohol be flashed to vapor per single stage employing this invention. In the general case, it appears that optimum recovery of the alcohol relative to the amount of reversion encountered is in the order of about 65–70% (e.g., from about 60 to about 75%) per single stage employing this invention.

The pressure to which the alcohol-acid mixture and/or the steam-alcohol-acid mixture is(are) subjected prior to entry thereof into the flash distillation zone is not critical, and may be maintained at any level. Likewise, the flash distillation zone may be maintained at any desirable pressure, provided that the distillation zone pressure is such relative to the steam-alcohol-acid mixture that flashing of the alcohol in that mixture occurs when the mixture is introduced into the distillation zone. In some cases, it will be most convenient to maintain the incoming steam-acid-alcohol mixture at about atmospheric pressure and maintain the flash distillation zone at a lesser pressure. However, in most cases, it will be found most convenient and effective to maintain the flash distillation zone at about atmospheric pressure and to maintain the incoming steam-acid-alcohol mixture at an elevated pressure. This can be done most simply by the use of steam under superatmospheric pressure. Where a jet mixer or like apparatus is used to effect mixing of the steam and the acid-alcohol mixture, the pressure drop in such a mixer also will act to reduce the pressure on the effluent mixture, thus aiding flashing of the alcohol. Where steam under superatmospheric pressure is used, the pressure need not be high—steam at a pressure of from about 30 to about 100 pounds per square inch gauge will be quite satisfactory for the purpose.

Substantially immediately after the steam has been mixed with the alcohol-acid mixture, the resulting mixture is introduced into the flash distillation zone in such a way that the liquid portion of that mixture is present in that zone only as a liquid on a solid surface within that zone, and the liquid film is maintained so long as flashing of vapor from that film is occurring. It is only by accomplishing the flashing of the alcohol vapor in this way that the heat from the steam is transferred to the alcohol and the alcohol removed at the rate and under the conditions which prevent transfer of heat to effect the reversion of the alcohol and/or the alcohol precursors to the source olefin. Any means, mechanically and apparatus-wise, can be used to effect entry of the liquid mixture into the distillation zone as a film, and maintenance of that film for the necessary time period. For example, the liquid can be introduced onto a baffle, or series of baffles, or on solid surfaces so arranged as to provide the necessary liquid film. The essential factor is that the liquid enter the flash distillation zone as a liquid film, and that the liquid be maintained only as a film in the distillation zone during the time that flashing of vapor from that liquid is occurring.

It is preferred that the liquid film be as thin as possible, and that it extend over as large an area as possible, as a practical matter, since flashing of the alcohol is facilitated by decreasing film thickness and by increasing film area. It is preferred that the liquid cover—that is, wet—a substantial part and preferably all of the surface area within the flash distillation zone.

Preferably, the liquid film also is subjected to centrifugal forces during the period the flashing is occurring. A most convenient physical embodiment for this purpose, and to be preferred because of its convenience, high efficiency for the desired purpose and simplicity of construction (which permits easy construction from corrosion-resistant materials if desired, and is easily maintained) comprises employing a flash chamber which is constructed so that an interior surface is substantially a continuous surface of revolution, and flowing the liquid onto that surface tangentially thereto in such a way and at such a rate that the liquid is always maintained thereon as a thin liquid film subjected to substantial centrifugal forces. The centrifugal forces further aid in separating liquid from vapor. One convenient physical embodiment comprises the use of a spherical flash distillation zone or a cylindrical zone with the longitudinal axis vertical, with provision for entry of the liquid onto the inner surface of the spherical or cylindrical zone tangential to that surface, and in a substantially horizontal direction, at such a rate that the liquid remains as a thin liquid film on that surface, swirling downwardly in a spiral path over that surface, to be collected and withdrawn from the bottom of the flash distillation zone, and the vapors resulting from the flash distillation being separately withdrawn from the flash distillation zone. Another convenient physical embodiment comprises the use of a "cyclone"—i.e., a conical vessel or a conical vessel having a cylindrical section superimposed on the upper portion of the conic section in which the small end of the conic section is to the bottom—in which the liquid is passed onto, and flows downwardly over the inner surface of the cyclone in much the same manner as described for the spherical and/or cylindrical flash distillation zone.

In effecting the flashing of the alcohol in the alcohol-acid mixture, the conditions, and the steam-alcohol-acid mixture ratio, can be so chosen that but a part of the alcohol is vaporized, or they can be so chosen that substantially all of the alcohol is vaporized. When substantially all of the alcohol is removed from the acid, the stripped acid can be recycled (if the acid strength thereof permits direct recycling), or it can be diluted or concentrated so that it can be directly recycled. Where but a part of the alcohol is removed, and where the acid strength permits, the stripped acid can be recycled without further treatment, as in the process shown in U.S. 2,609,400, or the stripped acid can be further treated to effect removal of a part or all of the remaining alcohol therein. In this latter case, the flash distillation can be performed in a physically completely separate flash distillation zone, or the flash distillation can be performed in a zone which is physically closely connected to, or a part of, a stripping zone. Thus, the flash distillation zone can be made physically a part of a stripping column, the liquid from the flash distillation zone passing to the top tray (or to the top portion, if a packed tower) of a stripping zone, the vapors from the stripping zone passing out of the column with the vapors from the flash distillation zone. Also, if desired, a further, distillation, zone may be superimposed physically on the flash distillation zone, so that the vapors pass into that further, distillation, zone; in such a case, however, provision must be made to by-pass the downcoming liquid from the superimposed distillation zone around the flash distillation zone, so that the downcoming liquid will not interfere with the flash distillation.

When a combination flash zone-stripping zone column is used, according to the process of the invention, steam is used to effect the flashing of the alcohol, and also is used to effect the stripping of the alcohol in the stripping zone. In such a case, the stripping zone is conventional, and the manner in which the stripping is carried out likewise is conventional, taking into account change in alcohol concentration due to the flashing of a part of the alcohol. It has been found that through the use of this combination flash zone-stripping zone, there is often effected a substantial reduction in the total amount of steam required to recover the alcohol from a given alcohol-acid mixture as compared to the amount of steam required to recover that alcohol in a conventional stripper wherein all of the steam is used to strip the alcohol in a stripping zone. Because this combination of a flash zone, according to the generic aspect of this invention, and a stripping zone leads to substantial advantages in the over-all recovery of alcohol from alcohol-acid mixtures, this combination forms a subgeneric, and the preferred, aspect of this invention.

Where a combination flash zone-stripping zone column is used, it is preferred that the flash zone be so constructed and the liquid portion of the steam-alcohol-acid mixture be so introduced into that flash zone that the major part, and desirably substantially all, of the flashing of the alcohol be complete before the liquid phase passes out the stripping zone. This manner of operation permits of more steady-state operations in the stripping zone.

In the use of this preferred aspect of the invention, in some cases it will be found that the flash distillation zone can be operated independently of the stripping zone—that is to say, the interposition of the flash distillation zone has no effect on the operation of the stripping zone, or the stripping zone can be so operated that the liquid from the flash distillation zone can be used as the feed to the stripping zone without regard to the composition of the liquid from the flash distillation zone. In such cases, the amount of steam fed to the flash distillation zone per unit weight of alcohol-acid mixture need not be related to the operation of the stripping zone. In by far the great majority of cases, however, a given stripping zone will effectively effect stripping of the alcohol from but certain alcohol-acid-water mixtures, so that the conditions of operation used in the flash distillation zone—particularly the amount of steam fed per unit weight of alcohol-acid mixture—must be related to the conditions used—the number of trays (or equivalent in packed columns) and the amount of steam—in the stripping zone.

The foregoing constitutes the general description of the invention. The following examples are included to demonstrate application of the invention in particular instances. These examples are included herein only for the purpose of illustrating the invention, and their presence is not intended to, and is not to be construed as, limiting the invention in any manner not recited in the claims of this application.

*Example I*

To ascertain the advantages of this invention, a typical mixture of isopropyl alcohol and aqueous sulfuric acid, obtained by absorbing propylene in sulfuric acid and hydrolyzing the esters in the resulting mixture with water, was stripped of isopropyl alcohol. The alcohol-acid mixture had the composition:

| Component: | Composition (Percent by weight) |
|---|---|
| Propyl hydrogen sulfate | 14.5 |
| Dipropyl sulfate | 0.6 |
| Sulfuric acid | 36.8 |
| Water | 29.0 |
| Isopropyl alcohol | 18.5 |
| Polymers and other materials | about 0.6 |

Immediately prior to treatment to remove the alcohol, the alcohol-acid mixture was diluted with water until the acid strength (hydrocarbon-free basis) was about 60 percent by weight.

The apparatus used was a 3-inch, 9-tray glass Oldershaw column modified by interposition of a flashing section above the top tray of the column. The flashing section was a cylindrical vessel on one side of which was positioned a jet mixer. In one series of experiments, the outlet of the mixer was positioned in such a way that the effluent therefrom was passed to a point slightly above the top tray of the column, so that the effluent passed from the mixer to the top tray. In another series of experiments, the outlet of the mixer was positioned in such a way that the effluent therefrom was directed substantially horizontally and tangentially onto the inner wall of the flash vessel with sufficient velocity that the liquid swirled down the wall of the flash vessel onto the top tray of the column. The column and the flash vessel were accompanied by the usual accessories to determine flow rates, to permit sampling, and the like.

In a first series of experiments, employing a method which will be termed Base Method A, the diluted alcohol-acid mixture was stripped using the column only, the diluted alcohol-acid mixture being directed through the jet mixer (no mixing occurring therein, since no steam passed to the mixer) and onto the top tray of the column. First, the column was heated by injecting steam just below the bottom tray, after which the diluted alcohol-acid mixture was passed into the column. The feed rates then were adjusted to approach conditions of maximum throughput commensurate with acceptable operability. The column was allowed to come to equilibrium, then the data for the experimental runs were taken.

In a second series of experiments, employing a method which will be termed Method X, the diluted alcohol-acid mixture was mixed with steam in the jet mixer and the effluent was passed directly onto the top tray of the column. Operation was otherwise as for Base Method A.

A third series of experiments was performed, employing a method which will be termed Base Method B. This method was the same as Base Method A, except that the effluent from the mixer was directed tangentially onto the inner surface of the flash chamber.

A fourth series of experiments was performed, the method being designated as Method Y. This method was the same as Method X, except that the effluent from the mixer was directed tangentially onto the inner surface of the flash chamber.

The residence times in the jet mixer were in all cases from about 0.2 to about 0.4 millisecond.

The data obtained established the following facts:

(1) The results from Base Method A were not significantly different from those of Base Method B.

(2) In all experimental runs using Method X, severe foaming, high reversion rates and unsteady-state operation were encountered.

(3) Method Y permitted about 28% higher throughput than did Base Method B.

(4) No significant difference in reversion rate was noted between the experimental runs using Method Y and those using Base Method B.

*Example II*

In confirmation of the results set out in Example I, a commercial-scale process for the production of isopropyl alcohol from propylene was modified by the insertion of a steam jet mixer-flash distillation chamber unit above the conventional stripping column used to strip isopropyl alcohol from the isopropyl alcohol-sulfuric acid mixture obtained by absorption of propylene in sulfuric acid and hydrolysis of the resulting esters. The jet mixer comprised a vertical line through which the acid mixture flowed vertically upward, the vertical line being connected at right angles to a horizontal line through which steam was passed. In Method X, the horizontal line passed into the flash chamber in such a way that the effluent mixture flowing therefrom flowed out into the space enclosed by the flash vessel and then fell onto the top tray of the stripping unit. In Method Y, the horizontal line passed into the flash chamber in such a way that the effluent mixture flowing therefrom was flowed substantially horizontally and tangentially as a film onto the inner surface of the flash chamber, the liquid then swirling down the side of the flash chamber onto the top tray of the stripping column. The flash chamber was a cylindrical vessel positioned directly above the top tray of the stripper unit, the longitudinal axis of the flash vessel coinciding with the longitudinal axis of the stripping column.

Using the same isopropyl alcohol-sulfuric acid mixture in all experiments, and employing different feed rates, different amounts of steam per unit of feed and different relative amounts of steam in the flash zone and in the stripping zone, residence times in the jet mixer being from about 2 to about 4 milliseconds, the following facts were established:

(1) Using the equipment as in Method X, without introducing the steam-acid-alcohol mixture into and maintaining it within the flash zone as a liquid film, steady state operation was not possible—increased reversion resulted and a product of varying content and purity was obtained.

(2) Using the equipment as in Method Y—that is, practicing the invention:

(a) An increase of about 20 percent in the production of isopropyl alcohol over that obtainable by the use of the stripper alone was obtained. Using the invention, the flow through the flasher-stripper was limited by existing flow metering equipment. From the data obtained, it was apparent that with adequate flow metering equipment, a further substantial increase in the production of isopropyl alcohol could have been obtained through practice of the invention.

(b) The increase in production of isopropyl alcohol was accomplished without any significant increase in the amount of reversion to propylene.

(c) No difficulty with foam or froth was encountered in the experiments with the increased rates of isopropyl alcohol production.

(d) The total amount of steam required to strip the isopropyl alcohol from the feed mixture was about 15.5% less when the invention was practiced than when it was not practiced.

*Example III*

The results set out in Example II were confirmed in further large-scale experiments. In these experiments recovery of isopropyl alcohol from a reaction mixture obtained by absorbing propylene in sulfuric acid was carried out in an apparatus consisting of a flash zone consisting of a cylindrical vessel superimposed upon a conical vessel tapering toward the bottom, the flash zone being superimposed upon a stripping zone consisting of a conventional stripping column wherein alcohol is stripped by steam from an alcohol-acid mixture. Steam was mixed with an isopropyl alcohol-sulfuric acid mixture in a steam jet mixer, the mixer outlet directing the effluent mixture horizontally and tangentially onto the inner surface of the cylindrical section of the flash vessel, from which the liquid passed into the stripping zone.

A mixture of propylene and propane containing approximately 55 mole percent propylene was contacted with 78 weight percent sulfuric acid in water at a temperature of about 55° C. The product contained 30 percent by weight of bound propylene. 14,600 kilograms of the product was mixed with 485 kilograms of water. The resulting acid solution was mixed with 2,460 kilograms of steam and the resulting mixture was passed into the flash zone. The residence time in the mixer was 5 milliseconds. 4,310 pounds of steam were passed into the bottom of the stripping zone. More than 99% of the propylene in the original acid solution was recovered. The concentration of sulfuric acid obtained from the bottom of the stripping zone was 50 weight percent. Steam consumption was 1.08 pounds per pound of isopropyl alcohol.

This throughput is approximately 30% greater than the throughput which can be obtained in the old procedure, that is, stripping the isopropyl alcohol-sulfuric acid mixture in the same stripper without the flash distillation zone. When the old procedure is used, there is required 1.25 pounds of steam per pound of isopropyl alcohol, so that the new procedure results in a saving of about 15% in steam consumption. The amount of reversion in the new procedure was not substantially different than the amount of reversion normally encountered in the old. Foam and froth, often encountered in the old procedure, were not encountered in the new.

*Example IV*

To ascertain the advantages of the invention with respect to the production of secondary butyl alcohol, another commercially valuable alcohol, a typical mixture of secondary butyl alcohol and aqueous sulfuric acid, obtained by absorbing n-butylene in sulfuric acid and hydrolyzing the esters in the resulting mixture with water, was stripped of secondary butyl alcohol. The alcohol-acid mixture had the composition:

| Component: | Composition (Percent by weight) |
|---|---|
| Butyl hydrogen sulfate | 21.0 |
| Dibutyl sulfate | 0.5 |
| Sulfuric acid | 33.0 |
| Water | 14.0 |
| Secondary butyl alcohol | 31.0 |
| Polymers and others | about 0.5 |

The apparatus and procedures of Example I were used. Immediately before treatment to remove the alcohol, the alcohol-acid mixture was diluted with water until the acid concentration (hydrocarbon-free basis) was about 65 percent by weight.

The data obtained established the following facts:

(1) The results obtained from Base Method B were not significantly different from those obtained from Base Method A.

(2) In all experimental runs using Method X severe foaming occurred, a high rate of reversion resulted and steady-state operation could not be attained.

(3) By practicing the invention (Method Y), an increase of as much as 42%, with an average increase of about 31%, in throughput was obtained, as compared to experimental runs not practicing the invention (i.e., Base Method B).

(4) The increased throughputs obtained through practice of the invention (Method Y) were obtained without significant increase in the amount of reversion to propylene over the amount obtained in Base Method B.

(5) No difficulties with formation of foam or froth were encountered in the experimental runs practicing the invention (Method Y) despite the high throughput rates employed therein.

I claim as my invention:

1. In a process for preparing a secondary alcohol by absorption of an aliphatic olefin in an aqueous solution of a strong polybasic inorganic acid, hydrolysis with water of the resulting esters of said acid and stripping of secondary alcohol from the mixture resulting from such hydrolysis, the improvement which comprises mixing steam with the said hydrolysis mixture and passing the resulting mixture substantially immediately thereafter into a flash distillation zone in such a way that the liquid portion of the mixture is maintained as a liquid film in that zone while vaporous materials are flashing from said mixture, and recovering vaporous secondary alcohol from said flash distillation zone.

2. A process according to claim 1 wherein the alcohol is isopropyl alcohol, the olefin is propylene and the inorganic acid is sulfuric acid.

3. A process according to claim 1 wherein the alcohol is secondary butyl alcohol, the olefin is n-butylene and the inorganic acid is sulfuric acid.

4. In a process for preparing a secondary alcohol by absorption of an aliphatic olefin in an aqueous solution of a strong polybasic inorganic acid, hydrolysis with water of the resulting esters of said acid and stripping of secondary alcohol from the mixture resulting from such hydrolysis, the improvement which comprises mixing steam with the said hydrolysis mixture and passing the resulting mixture within a very short time thereafter into a flash distillation zone wherein at least a part of the secondary alcohol in said mixture is flashed to vapor and is recovered from said flash distillation zone, with the proviso that the liquid portion of the mixture is maintained in said flash distillation zone as a liquid film on a solid surface in that zone during a substantial part of the time in which flashing of the secondary alcohol is occurring and with the further proviso that the liquid in the flash zone is subjected to centrifugal forces during a substantial part of the time in which flashing of the alcohol is occurring.

5. The improvement according to claim 4 wherein the mixing of the steam with the hydrolysis mixture and introduction of the resulting mixture into the flash distillation zone is effected within 10 milliseconds.

6. In a process for preparing a secondary alcohol by absorption of an aliphatic olefin in an aqueous solution of a strong polybasic inorganic acid, hydrolysis with water of the resulting esters of said acid and stripping of secondary alcohol from the mixture resulting from such hydrolysis, the improvement which comprises mixing steam with the said hydrolysis mixture, said mixing being conducted in a very short time, and passing the resulting mixture within a very short time thereafter into a flash distillation zone wherein at least a part of the secondary alcohol in said mixture is flashed to vapor and is recovered from said flash distillation zone, with the proviso that the said flash distillation zone is bounded by a surface of revolution and the said mixture is introduced tangentially onto that surface so that the liquid portion of said mixture forms a liquid film on said inner surface, introduction of the mixture being at such velocity that the said liquid film is subjected to centrifugal forces, and maintaining said liquid film during a substantial part of the time in which flashing of the secondary alcohol is occurring.

7. In a process for preparing a secondary alcohol by absorption of an aliphatic olefin in an aqueous solution of a strong polybasic inorganic acid, hydrolysis with water of the resulting esters of said acid and stripping of secondary alcohol from the mixture resulting from such hydrolysis, the improvement which comprises mixing steam with the said hydrolysis mixture, passing the resulting mixture within a very short time thereafter into a flash distillation zone in such a way that the liquid portion of the mixture is maintained as a liquid film in that zone while vaporous materials are flashing from said mixture, recovering vaporous secondary alcohol from said flash distillation zone, passing the effluent liquid from said flash distillation zone to a stripping zone immediately adjacent in space to the said flash distillation zone, in said stripping zone secondary alcohol being stripped from said liquid by means of steam, and recovering the secondary alcohol so stripped.

8. A process according to claim 7 wherein the alcohol is isopropyl alcohol, the olefin is propylene and the inorganic acid is sulfuric acid.

9. A process according to claim 7 wherein the alcohol is secondary butyl alcohol, the olefin is n-butylene and the inorganic acid is sulfuric acid.

10. In a process for preparing a secondary alcohol by absorption of an aliphatic olefin in an aqueous solution of a strong polybasic inorganic acid, hydrolysis with water of the resulting esters of said acid and stripping of secondary alcohol from the mixture resulting from such hydrolysis, the improvement with comprises mixing steam with the said hydrolysis mixture and passing the resulting mixture within a very short time thereafter into a flash distillation zone wherein at least a part of the secondary alcohol in said mixture is flashed to vapor and is recovered from said flash distillation zone, with the proviso that the liquid portion of the mixture is maintained in said flash distillation zone as a liquid film on a solid surface in that zone during a substantial part of the time in which flashing of the secondary alcohol is occurring and with the further proviso that the liquid in the flash zone is subjected to centrifugal forces during a substantial part of the time in which flashing of the alcohol is occurring, passing the effluent liquid from said flash distillation zone to a stripping zone immediately adjacent in space to the said flash distillation zone, in said stripping zone secondary alcohol being stripped from said liquid by means of steam, and recovering the secondary alcohol so stripped.

References Cited in the file of this patent

UNITED STATES PATENTS

| | | |
|---|---|---|
| 2,511,810 | Arnold | June 13, 1950 |
| 2,609,400 | Amick | Sept. 2, 1952 |